US012011676B1

(12) United States Patent
Keep

(10) Patent No.: US 12,011,676 B1
(45) Date of Patent: Jun. 18, 2024

(54) SOAPSUDS GENERATION APPARATUS

(71) Applicant: Kevin Keep, Eagle, ID (US)

(72) Inventor: Kevin Keep, Eagle, ID (US)

(73) Assignee: Zompers, LLC, Eagle, ID (US)

(*) Notice: Subject to any disclaimer, the term of this patent is extended or adjusted under 35 U.S.C. 154(b) by 155 days.

(21) Appl. No.: 17/835,829

(22) Filed: Jun. 8, 2022

Related U.S. Application Data

(60) Provisional application No. 63/339,738, filed on May 9, 2022, provisional application No. 63/330,717, filed on Apr. 13, 2022.

(51) Int. Cl.
*A63H 33/28* (2006.01)
*A47K 5/12* (2006.01)
*B01F 27/73* (2022.01)
*B01F 101/00* (2022.01)

(52) U.S. Cl.
CPC ........... *A63H 33/28* (2013.01); *A47K 5/1201* (2013.01); *B01F 27/73* (2022.01); *B01F 2101/4505* (2022.01)

(58) Field of Classification Search
CPC ....................................................... A63H 33/28
See application file for complete search history.

(56) References Cited

U.S. PATENT DOCUMENTS

| | | | | |
|---|---|---|---|---|
| 4,423,565 A * | 1/1984 | Bart | A63H 33/28 | 446/16 |
| 5,238,437 A * | 8/1993 | Vowles | A63H 3/003 | 446/268 |
| 5,462,469 A * | 10/1995 | Lei | A63H 33/28 | 446/15 |
| 6,416,377 B1 * | 7/2002 | Bart | A63H 33/28 | 446/15 |
| 6,786,251 B2 * | 9/2004 | Nadel | A63H 33/28 | 141/98 |

* cited by examiner

*Primary Examiner* — John A Ricci
(74) *Attorney, Agent, or Firm* — Rutan & Tucker, LLP

(57) ABSTRACT

An apparatus to generate soapsuds is described. The apparatus features a character lid, a lid attachment member, a holding member, an agitator, and a soap dispenser. The holding member includes a chamber portion sized to retain one or more soap tablets. The chamber portion has an opening, a closed end including an outlet, and lateral surfaces extending between the opening and the closed end. The agitator is rotationally coupled to the holding member and positioned under the outlet of the holding member. The soap dispenser includes a housing that encapsulates the agitator residing within a lower quadrant of the interior area of the housing. The housing includes apertures formed within the closed end to allow for soapsuds and soapy water passage through the opening and the outlet of the holding member, which causes the agitator to mix the soapy water residing within the interior area to generate soapsuds.

19 Claims, 11 Drawing Sheets

SOAPSUDS GENERATION APPARATUS

CROSS-REFERENCE TO RELATED APPLICATIONS

This application claims the benefit of priority on U.S. Provisional Application Nos. 63/330,717 filed on Apr. 13, 2022 and 63/339,738 filed on May 9, 2022, the entire contents of both of which are incorporated by reference herein.

FIELD

Embodiments of the disclosure relate to a soapsuds generation apparatus, and in particular, an apparatus for generating soapsuds for a bubble bath or kid playtime.

GENERAL BACKGROUND

For many generations, small children have been fascinated with bubbles. In fact, without bubble baths, parents would struggle to keep their small children clean. For this reason, bubble toys have been developed in which soapsuds (bubbles) are produced by water directly flowing from a bath spout into the toy and the water coming into direct contact with soap inserted into the toy. However, these bubble toys fail to produce a significant amount of soapsuds because there is an insufficient amount of agitation of the soapy water resulting after exposure of the water to the soap. This normally requires a parent to pour additional soap into the bath water and swirl the bath water by hand. A more-efficient apparatus for soapsuds generation is needed.

BRIEF DESCRIPTION OF THE DRAWINGS

Herein, embodiments of the invention are illustrated by way of example, and are not limited in the figures of the accompanying drawings.

DETAILED DESCRIPTION

Figure 1:
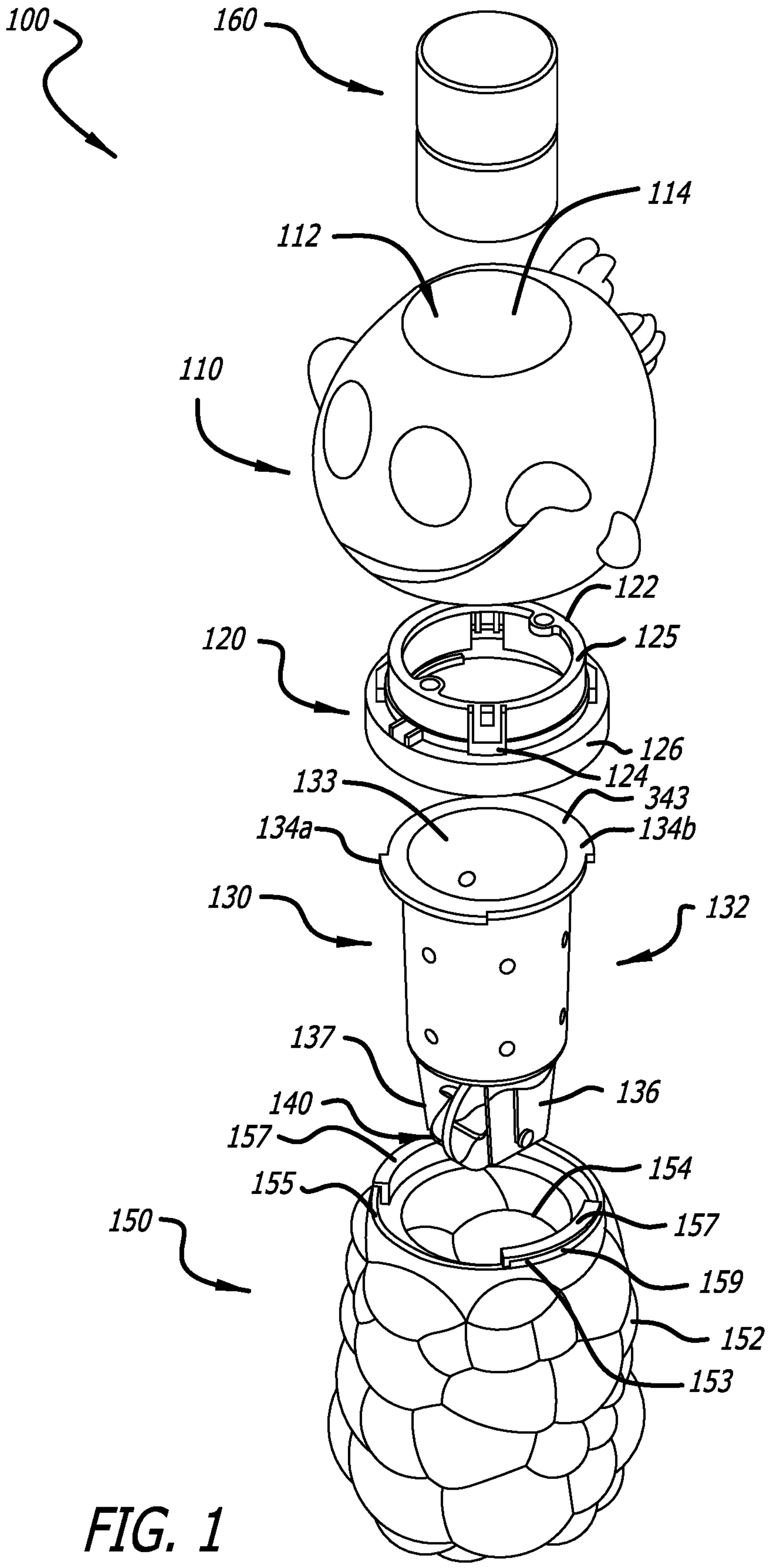
FIG. 1 is an exploded view of an exemplary embodiment of the soapsuds generation apparatus.

Embodiments of the disclosure relate to an apparatus configured for placement under a bathtub spout or faucet to receive a flow of water via an opening within a character lid of the apparatus. The apparatus features a character lid, a lid attachment member, a soap tablet holding member, and a soap dispenser. Herein, according to one embodiment of the disclosure, the soap tablet holding member is sized for placement within an interior area of the soap dispenser, which is coupled to the lid attachment member. The lid attachment member is further coupled to the character lid, thereby forming a soapsuds generation apparatus described herein.

One or more soap tablets can be inserted into a chamber portion of the soap tablet holding member, where the chamber portion features tapered lateral surfaces to form a conical shape. The conical configuration of the chamber portion allows for greater agitation of water flowing across a surface of a soap tablet than the chamber portion featuring a cylindrical shape, especially when two or more soap tablets are stacked on each other. Soapsuds are generated by agitation of the water in receipt of soap particulates from the soap tablets (hereinafter, "soapy water") within the chamber portion of the soap tablet holding member. These soapsuds seep through lateral apertures within the tapered lateral surfaces of the soap tablet holding member and into the interior (inner chamber) of the soap dispenser.

Additionally, the soapy water propagates through an outlet positioned at a bottom surface of the chamber portion of the soap tablet holding member. The soapy water flows via the outlet towards an agitator, which is configured with a pinwheel architecture located within the interior of the soap dispenser. An agitator wheel is vertically aligned with the outlet so that the soapy water flows from the outlet and contacts slats extending from the agitator wheel. As the soapy water contacts the slats, the agitator wheel rotates to further churn the soapy water residing within the interior of the soap dispenser prior to its continued flow through apertures formed within a bottom surface of the soap dispenser. Hence, the agitator creates soapsuds from the soapy water in combination with the soapsuds seeping through lateral apertures of the soap tablet holding member. The resultant soapsuds along with remnant soapy water, collected within an interior of the soap dispenser, are released through the apertures within the soap dispenser.

I. TERMINOLOGY

The following discussion provides example embodiments of the inventive subject matter. Although each embodiment represents a single combination of inventive elements, the inventive subject matter is considered to include all possible combinations of the disclosed elements. Thus, if one embodiment comprises elements X, Y, and Z, and a second embodiment comprises elements A and B, then the inventive subject matter is also considered to include combinations of X, Y, Z, A and/or B, even if not explicitly disclosed.

The term "soap" is generally defined as a chemical substance (surfactant) that, when used with water or another solution, operates as a cleaning agent for washing and cleaning. Chemical compositions, such as an oil, a scented compound (perfume) and/or coloring may be added to the soap. The term "soapy" describes a condition in which a liquid includes a small concentration of soap particulates. Lastly, "soapsuds" describes bubbles produced by agitation of a soapy liquid (e.g., soapy water) in combination with remnant soapy liquid (e.g., bubbles and soapy water).

As used in the description herein and throughout the claims that follow, the meaning of "a," "an," and "the" includes plural reference unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. SOAPSUDS GENERATION APPARATUS

Referring to FIG. 1, an exploded view of an exemplary embodiment of a soapsuds generation apparatus 100 is shown. When in operation, the soapsuds generation apparatus 100 is positioned to receive a flow of water from a bathtub spout, a sink faucet, or the like. According to this embodiment of the disclosure, the soapsuds generation apparatus 100 features a character lid 110, a lid attachment member 120, a soap tablet holding member 130, an agitator 140, and a soapsuds dispenser 150. As shown, the soap tablet holding member 130 and the agitator 140 are inserted inside a partially enclosed housing 152 of the soapsuds dispenser 150. The lid attachment member 120 is physically coupled to and is accessible via a second opening 116 (see FIG. 2A) of the character lid 110 and is removably coupled to an opening 154 of the soapsuds dispenser 150.

As shown in FIG. 1, the character lid 110 includes a conduit 112 that features a first (top) opening 114 located at a first end of the conduit 112 and the second (bottom) opening 116 located at a second end of the conduit 112. This conduit 112 is sized with a diameter to allow one or more soap tablets 160 to pass through the conduit 112 for retention within a chamber portion 132 of the soap tablet holding member 130. It is contemplated that the lid attachment member 120 is also sized with an opening having a diameter greater than a diameter (or width) of the soap tablet(s) 160.

The lid attachment member 120 features a first circular segment 122 sized for insertion within the bottom opening 116 and fastened to a ridge (see locking ridge 118, FIG. 2C) extending from an inner surface 210 of the conduit 112. When the first circular segment 122 is inserted through the bottom opening 116, the locking elements 124 oriented along the lateral surface 125 of the first circular segment 122 undergo inward forces for placement into a decompressed state upon coming into contact with the locking ridge 118. The locking elements 124 return to a normal state once the inward forces are discontinued and the locking elements 124 clear the locking ridge 118 so as to fasten the lid attachment member 120 to the character lid 110.

The lid attachment member 120 further includes a second circular segment 126 sized with an outer diameter larger than an outer diameter of the first circular segment 122 and sized for retention on a ledge portion 155 extending radially along the opening 154 of the housing 152 for the soapsuds dispenser 150. Although not shown in FIG. 1 (but shown in detail in FIGS. 2B & 5B), an inner surface 127 of the second circular segment 126 includes at least one flange 128 extending substantially orthogonal from the inner surface 127. For this embodiment, the flange(s) 128 include a pair of flanges positioned diametrically opposite from each other. When character lid 110 is fastened to the lid attachment member 120 and the lid attachment member is being attached to the soap dispenser 150, each flange 128 slides into a channel 153 created within a segment 157 (extending from a circular boundary element 159 orthogonal to the ledge portion 155) of the soap dispenser 150.

As still shown in FIG. 1, the soap tablet holding member 130 includes the chamber portion 132 and a pair of support members 136/137 extending from opposite sides of the chamber portion 132. The soap tablet holding member 130 is sized with the chamber portion 132 to reside within the housing 152 of the soapsuds dispenser 150, where a ledge portion 134 of the soap tablet holding member 130 rests upon the ledge portion 155 of the soapsuds dispenser 150 and a larger width segments 134*a*/134*b* of the ledge portion 134 are positioned between the segments 157 (e.g., segments 510 and 520 of FIG. 5).

Herein, as shown particularly in FIG. 1, the chamber portion 132 includes an opening 133 with the ledge portion 134 extending radially and outwardly from a circumference of the opening 133. The agitator 140 is positioned between and partially maintained by the pair of support members 136/137. In addition, the agitator 140 is rotatably coupled to the support members 136/137.

Figure 2A:
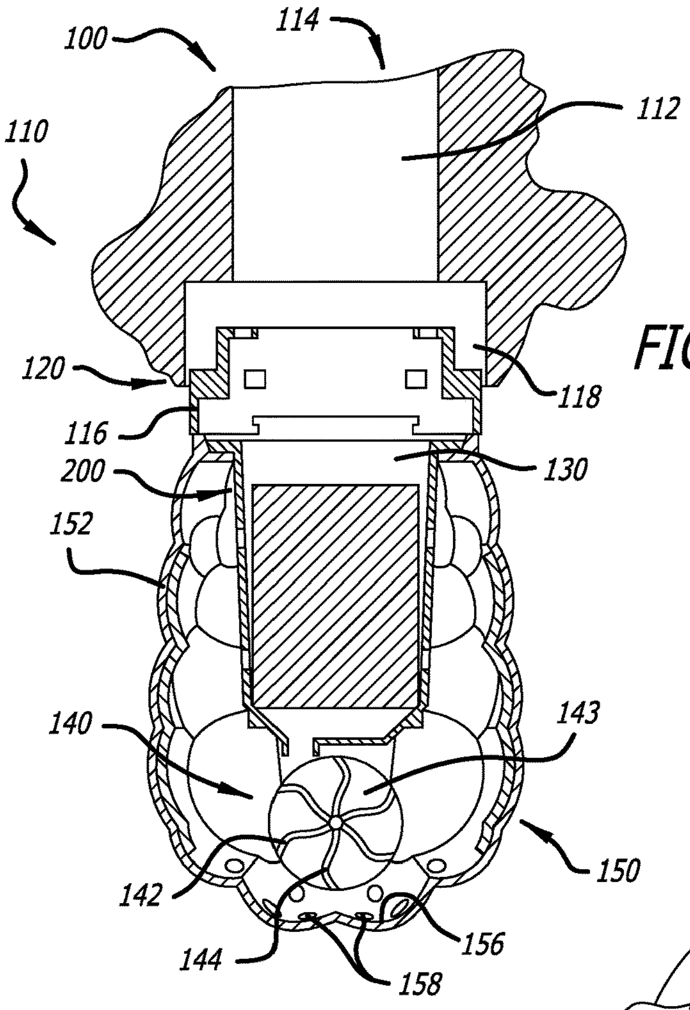
FIG. 2A is a cross-sectional side view of the soapsuds generation apparatus of FIG. 1 after assembly.

Referring now to FIG. 2A, a cross-sectional side view of the soapsuds generation apparatus 100 of FIG. 1 after assembly is shown. For this embodiment, the soap tablet holding member 130 is positioned within an inner chamber 200 of the housing 152 for the soapsuds dispenser 150. In particular, as shown in FIG. 2A, the agitator 140 is positioned near a bottom surface 156 of the housing 152 (and chamber 200) for the soapsuds dispenser 150. The agitator 140 features a circular wheel 142 configured with a first lateral side 143 that features a first set of slats 144 and a second lateral side featuring a second set of slats (not shown). The first lateral side 143 is positioned on an opposite side of the wheel 142 as the second lateral side. According to one embodiment of the disclosure, the first set of slats 144 is staggered with slats extending from the second lateral side (e.g., slats 144 are not partially coplanar with slats extending from the second lateral side) to assist in the creation of the soapy water to provide better generation of soapsuds for seepage through apertures 158 positioned along the bottom surface 156 of the housing 152.

Figure 2D:
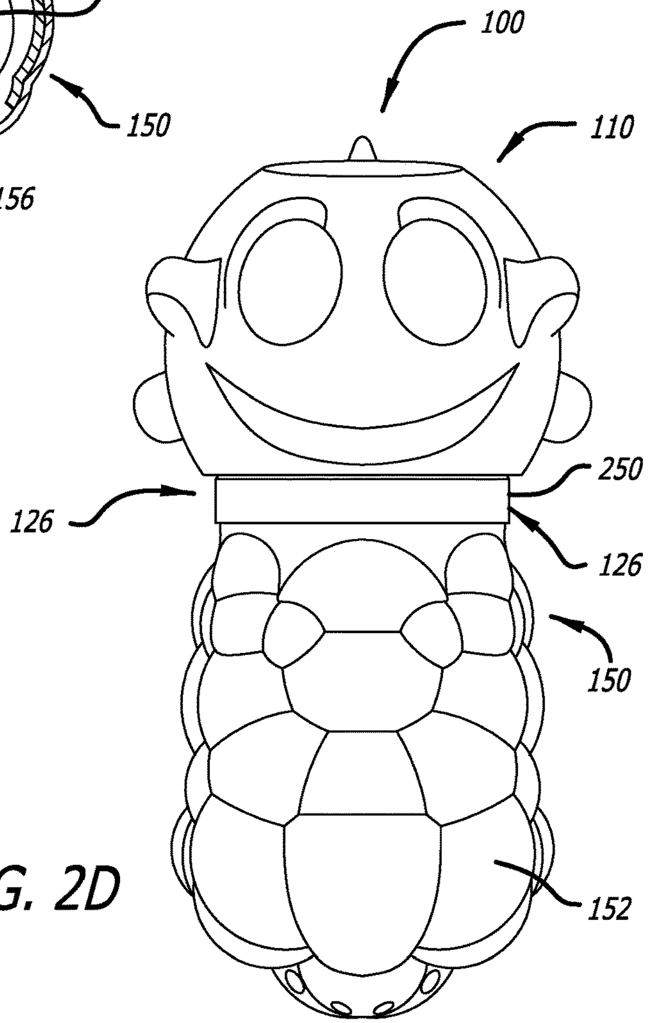
FIG. 2D is a front view of the soapsuds generation apparatus of FIG. 1 after assembly.
Figure 2B:
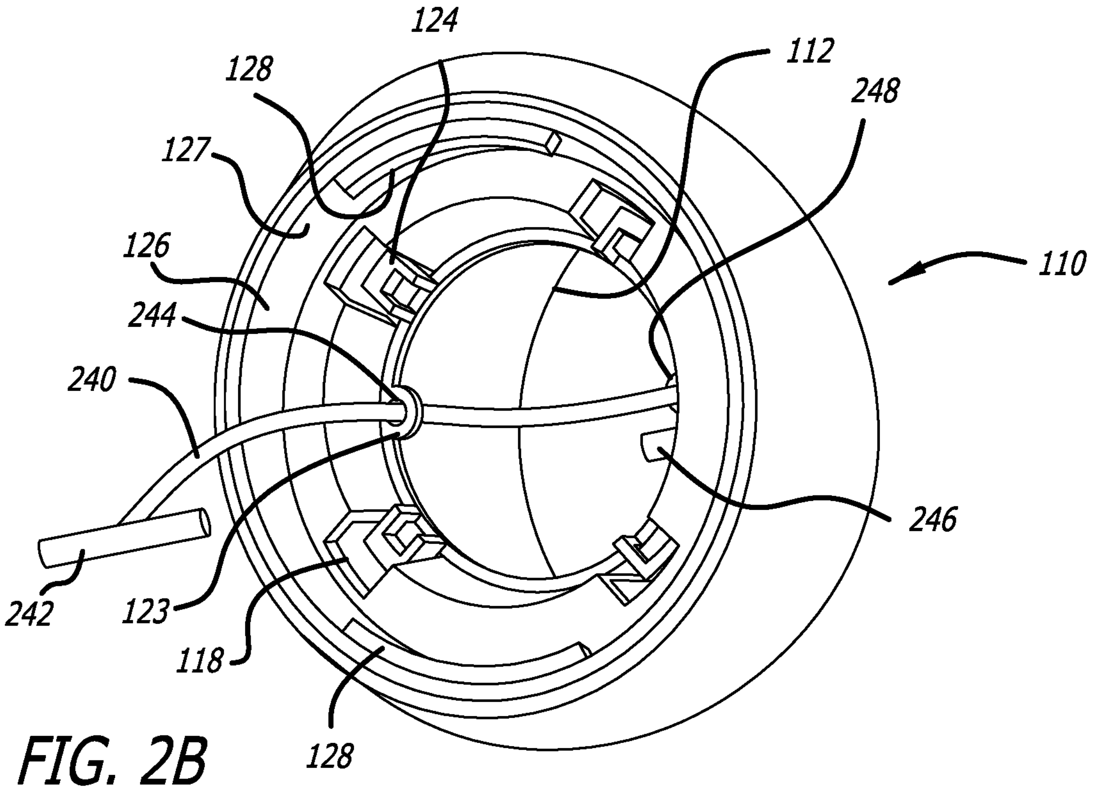
FIG. 2B is an upward view of an exemplary embodiment of a lid attachment member inserted within a second opening of the character lid and attached by a locking mechanism.
Figure 2C:
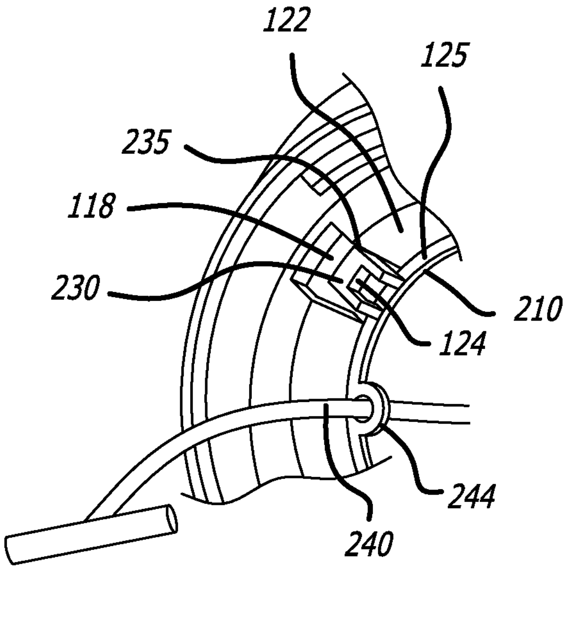
FIG. 2C is an enhanced view of the locking mechanism of FIG. 2B for coupling the lid attachment member to an inner surface of the character lid.

Referring to FIGS. 2B-2C, an upward view of an exemplary embodiment of the lid attachment member 120 inserted within a second (bottom) opening 116 of the character lid 100 and fastened by a locking mechanism 220 is shown. As shown and described above, where the first circular segment 122 is inserted through the bottom opening 116 of the character lid 110, the locking elements 124 of the locking mechanism 220 are implemented along the lateral surface 125 of the first circular segment 122. Upon continued upward movement of the first circular segment 122, the locking elements 124 experience inward forces upon coming into contact with the locking ridge 118 positioned along an inner surface of the character lid 210. This causes the locking elements 125 to be placed into a compressed state.

Thereafter, continued movement of the first circular segment 122 upwards from the bottom opening 116 causes discontinued application of the inward forces against the locking elements 124 when a lip portion 230 of each locking element 124 clears the locking ridge 118. Thereafter, the locking elements 124 return to a normal state in which the lip portions 230 of each locking element 124 are positioned to rest on a top surface 235 of the locking ridge 118 to fasten the lid attachment member 120 to the character lid 110.

The lid attachment member 120 further includes the second circular segment 126 sized for partial retention on the ledge portion 155 of the housing 152 of the soap dispenser 150 as shown in FIG. 1. The inner surface 127 of the second circular segment 126 includes the pair of flanges 128 extending substantially orthogonal from the inner surface 127. The flanges 128 are sized so that insertion of the flanges 128 into areas adjacent to the segments extending from of the ledge portion 155 and subsequent rotation of the character lid 110 featuring the lid attachment member 120 effectively slides the flanges 128 into channels 153 created within segments 157.

As further shown in FIGS. 2B-2C, a cord 240 with a first stopper mechanism 242 placed on a first end of the cord 240 may be threaded through a first cord attachment opening 244 formed on an inner surface 123 of the first circular segment 122. A second stopper mechanism 246 may be positioned at a second end of the cord map after threading through a second cord attachment opening 248, which is also formed on the inner surface 123 of the first circular segment 122. A looped portion of the cord 240 extends through the conduit 112 of the character lid 110 for hanging from a tub spout, faucet, a wall above the tub spout via a suction cup attachment (not shown), or the like.

Referring now to FIG. 2D, a front view of the soapsuds generation apparatus 100 of FIG. 1 after assembly is shown. After assembly, according to one embodiment of the disclosure, the character lid 110, a portion of the lid attachment member 120, and a portion of the housing 152 of the soap dispenser 150 is visible to the user. In particular, an outer surface 250 of the second circular segment 126 for the lid attachment member 120 extends beyond and encapsulates the segments 157 extending from the ledge portion 155 of the housing 152. The lid attachment member 120 is interposed between the removable character lid 110 and the removable soap dispenser 150. These removable components 110/120 allow for (i) removal of the soap tablet holding member 130 and agitator 140 for cleaning and (ii) substitution of different character lids to be positioned on the soap dispenser 150.

Figure 3A:
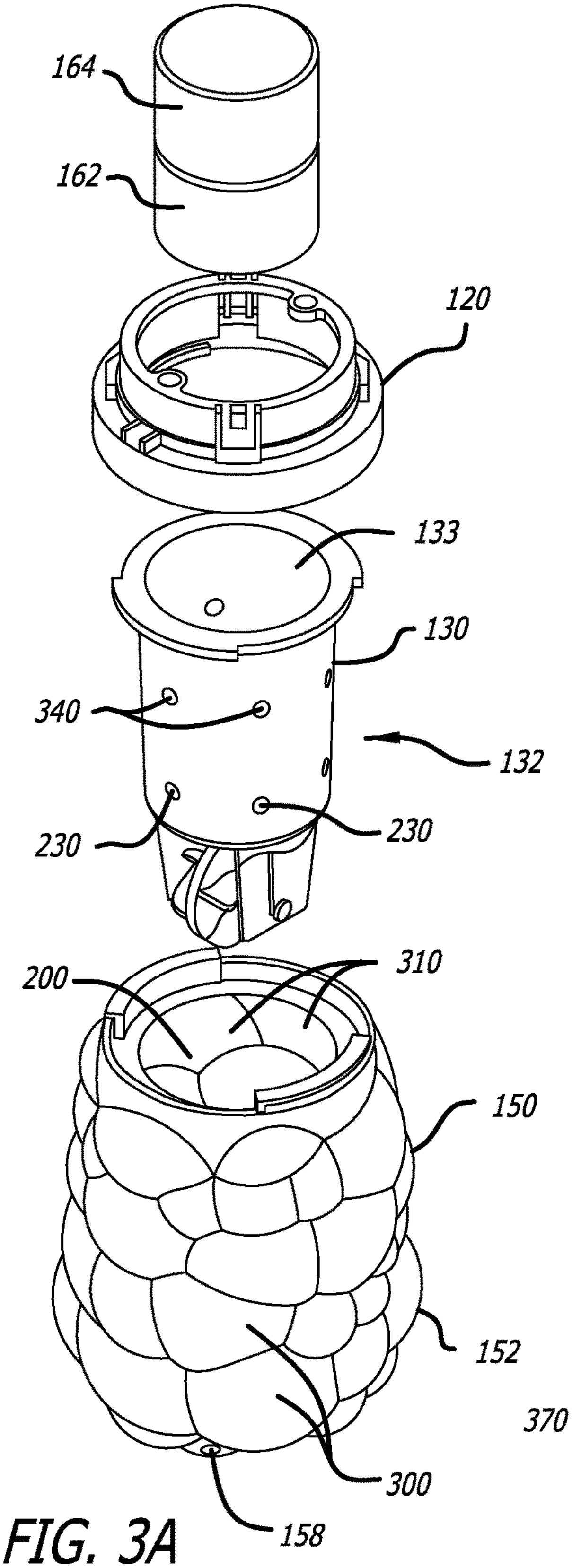
FIG. 3A is an exploded perspective view of the soapsuds generation apparatus of FIG. 1 without the character lid.

Referring now to FIG. 3A, an exploded perspective view of the soapsuds generation apparatus 100 of FIG. 1 without the character lid 110 is shown. Herein, the housing 152 of the soapsuds dispenser 150 includes a plurality of concave segments 300. These concave segments 300 provide a coarse (e.g., uneven), interior surface 310 of the housing 152 of the soapsuds dispenser 150. This coarse interior surface 310 assists in agitation of soapy water within the housing 152 to generate soapsuds before dispensing the soapsuds through the aperture 158. This increased agitation provides a benefit of increasing the output of soapsuds via the apertures 158.

As further shown in FIG. 3A, the chamber portion 132 of the soap tablet holding member 130 includes a first set (e.g., one or more) of side apertures 330 and/or a second set (e.g., one or more) of side apertures 340. The first set of side apertures 330 is positioned laterally from an expected position of a first soap tablet 162. As an optional feature, the second set of side apertures 340 is positioned laterally from an expected position of a second soap tablet 164, when residing within the chamber portion 132 of the soap tablet holding member 130 and placed on the first soap tablet 162. The first and/or second set of side apertures 330 and/or 340 are provided to avoid backflow of the soapsuds through the opening 133. More specifically, the first set of side apertures 330 are positioned to align laterally with the first soap tablet 162 upon being placed within the soap tablet holding member 130 and/or the second set of side apertures 340 are positioned to align laterally with the second soap tablet 164 if inserted into and residing on top of the first soap tablet 162 within the chamber portion 132 of the soap tablet holding member 130.

Figure 3B:
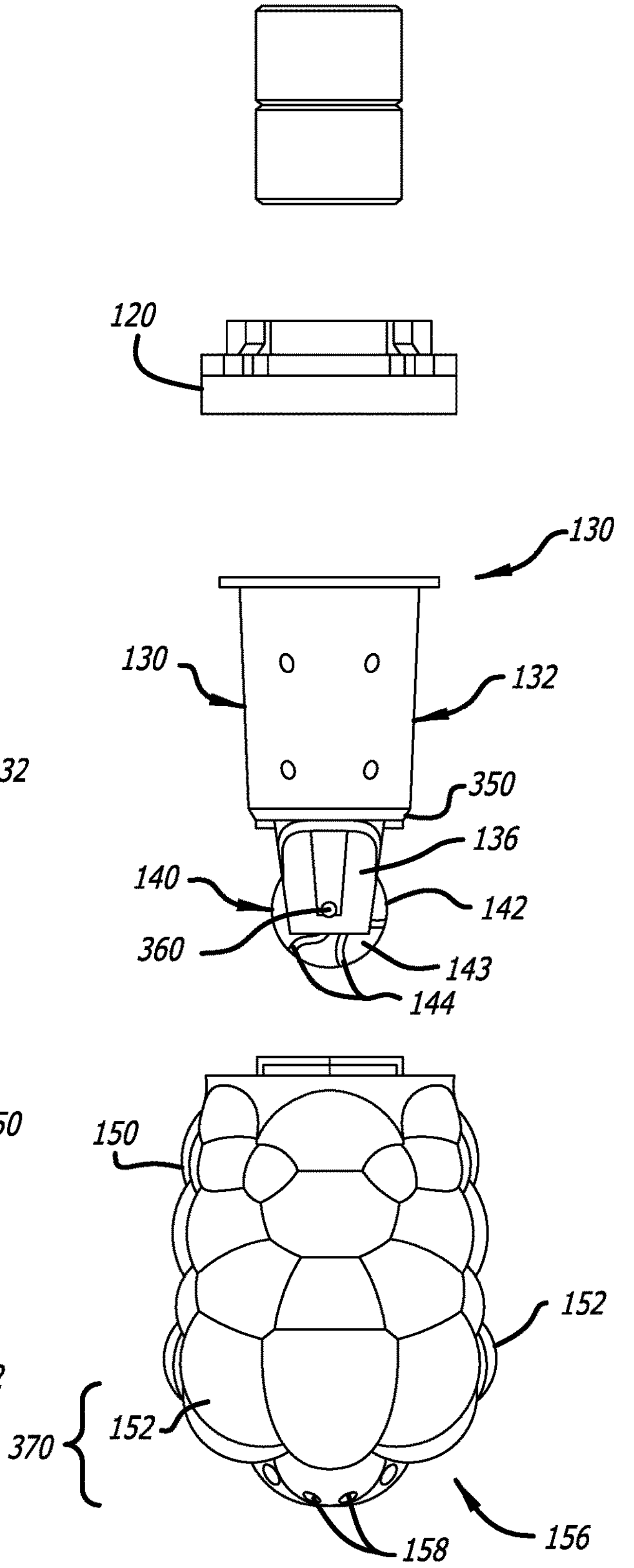
FIG. 3B is an exploded side view of the soapsuds generation apparatus of FIG. 3A.

Referring to FIG. 3B, an exploded side view of the soapsuds generation apparatus 100 of FIG. 3A is shown. Herein, the agitator 140 is more clearly illustrated, where the agitator wheel 142 features the slats 144 extending from the first lateral side 143 of the wheel 142. Although not shown, but shown in FIG. 4B as described below, the agitator wheel 142 includes a second lateral side with slats extending therefrom. As shown, slats 144 are oriented to receive soapy water from at least an flow output port (see port 440 of FIG. 4B) placed within a bottom surface 350 of the chamber portion 132 to cause the agitator 140 to receive a flow of soapy liquid and the force applied to the slats 144 causes the agitator wheel 142 to rotate around an axis created by an fastening member 360 (e.g., an agitator pin) maintained by the support members 136-137 extending from the chamber portion 132 of the soap tablet holding member 130.

Referring to FIGS. 2A & 3B, the agitator 140 is positioned in a lower quadrant 370 of the housing 152 for the soapsuds dispenser 150 and in close proximity to the apertures 158 positioned along the inner bottom surface 156 of the soapsuds dispenser 150. As further shown, the plurality of segments 300 that formulates the interior surface 310 of the housing 152 for the soapsuds dispenser 150 are shown that create a coarse interior surface 310.

Figure 4B:
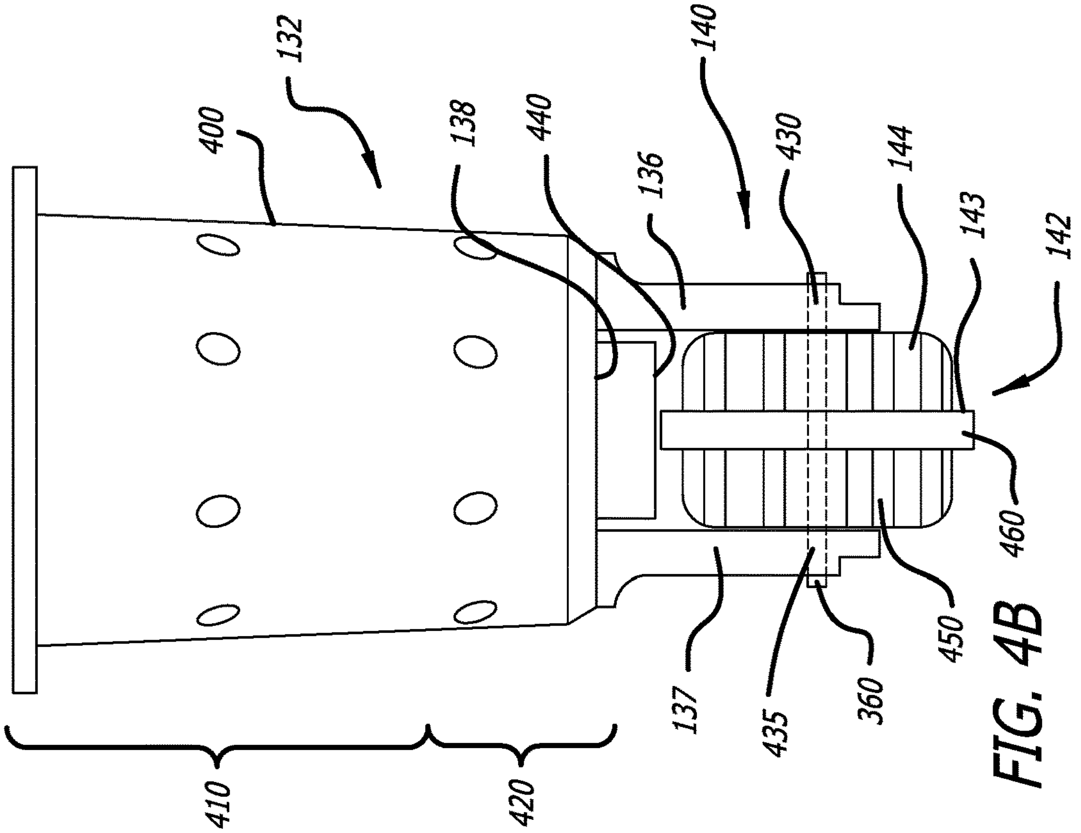
FIG. 4B is a front perspective view of the soap tablet holding member of FIG. 4A.
Figure 4A:
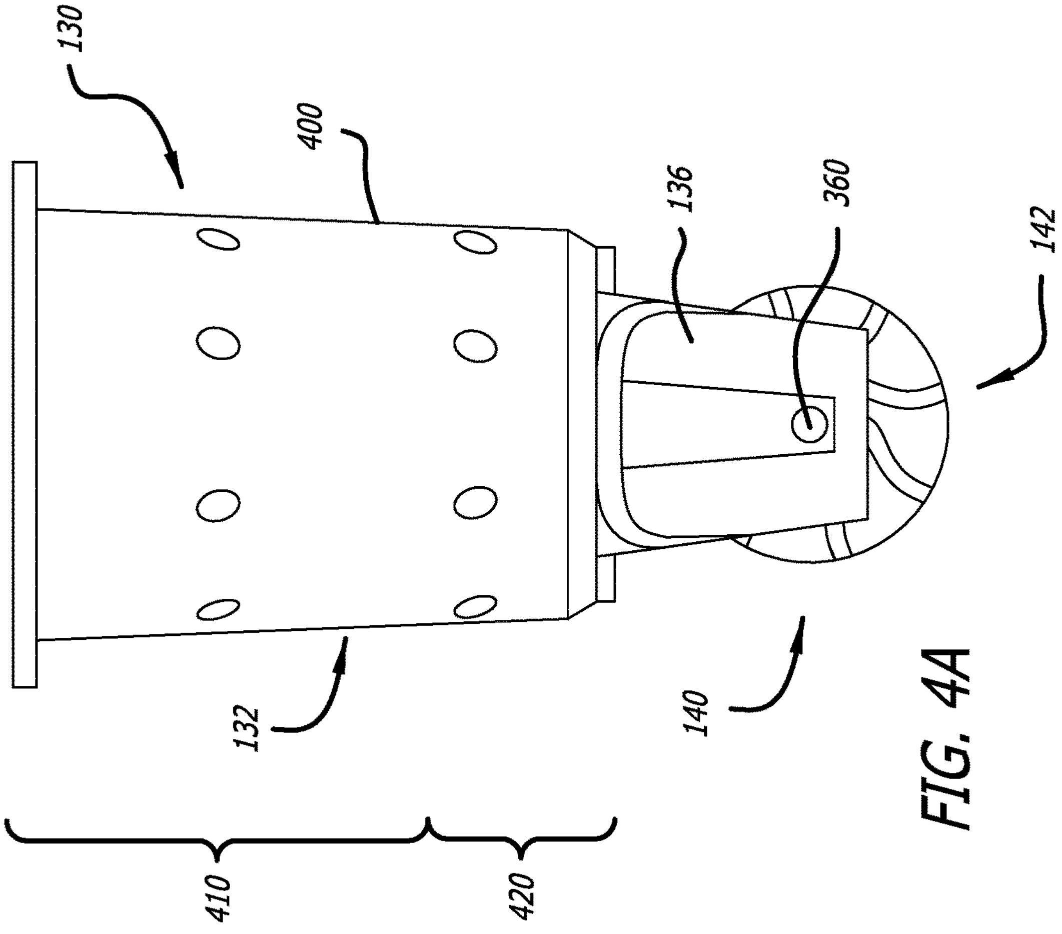
FIG. 4A is a side perspective view of a soap tablet holding member for the soapsuds generation apparatus of FIG. 1.

Referring now to FIGS. 4A-4B, side and front perspective views of the soap tablet holding member 130 for the soapsuds generation apparatus 100 of FIG. 1 and FIGS. 3A-3B is shown. Herein, lateral (cylindrical) surfaces 400 of the chamber portion 132 for the soap tablet holding member 130 are tapered to provide a greater distance between upper inner surface regions 410 of the chamber portion 132 than lower inner surface regions 420 of the chamber portion 132. This tapering allows for additional agitation of the soapy liquid (e.g., soapy water) to produce a greater concentration (and/or volume) of soapsuds than a non-tapered chamber configuration as described below.

As further shown in FIG. 4B, the agitator 140 is coupled to the support members 136-137 extending from the chamber portion 132 of the soap tablet holding member 130, where the agitator wheel 142 is configured to be rotatably coupled to support members 136-137. According to this embodiment of the disclosure, the fastening member 360 (e.g., agitator pin) is inserted through apertures 430 and 435 positioned in the support members 136 and 137 for retention of the agitator wheel 142. A flow output port 440 may be positioned at the bottom surface 138 of the chamber portion 132 by positioning a flow of soapy water escaping from the chamber portion 132 to rotate the agitator wheel 142 to further agitate the soapy water to create soapsuds.

As further shown in FIGS. 4A-4B, the slats 144 are positioned along the first lateral surface 143 of the agitator wheel 142 and other slats 450 are positioned along a second lateral surface 460 of the agitator wheel 142. The fluid (e.g., soapy water) flowing from the flow output port 440 in the chamber portion 132 causes rotation of the agitator wheel 142. According to one embodiment of the disclosure, the slats 144 and 450 formed in the agitator wheel 142 may extend horizontally from the lateral surfaces 143 and 460 and are curved with a first concave portion toward an axis tube of the agitator wheel 142 housing the fastening member 360 and a second convex portion towards an end of the slats 144 and 450. This angular configuration provides a greater amount of surface area than a linear-shaped slat for the soapy water to hit and rotate the agitator wheel 142 of the agitator 140. Additionally, the slats 144 and 450 may be angularly offset (i.e., staggered) to create greater agitation of the soapy water residing in the lower quadrant 370 of the housing 152 of the soap dispenser 150.

Figure 5A:
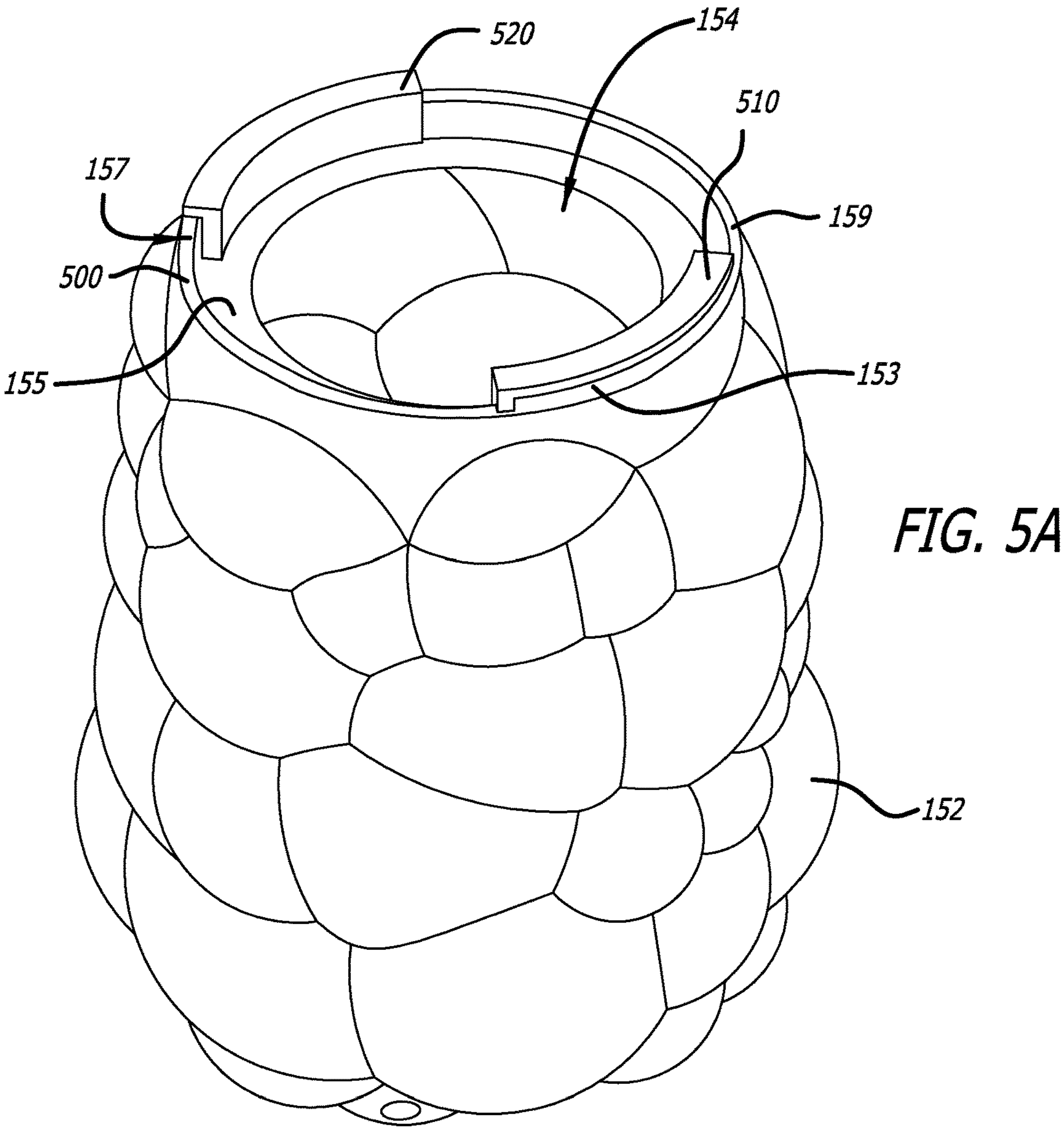
FIG. 5A is a perspective view of an exemplary embodiment of a soap dispenser for the soapsuds generation apparatus of FIG. 1.

Referring now to FIG. 5A, a perspective view of an exemplary embodiment of the soap dispenser 150 for the soapsuds generation apparatus 100 of FIG. 1 is shown. The soap dispenser 150 features the housing 152 with the chamber 200 to receive the soap tablet holding member 130 inserted through the opening 154. The ledge portion 155 extends radially along a perimeter 500 of the opening 154. Extending vertically from the ledge portion 155, the plurality of segments 157, in particular a first segment 510 and a second segment 520, are positioned along opposite sides of the perimeter 500. The first segment 510 and the second segment 520 extend from the circular boundary element 159 that is orthogonal to the ledge portion 155. Hence, the first segment 510 and the second segment 520 are partially orthogonal to the ledge portion 155, as shown.

Figure 5B:
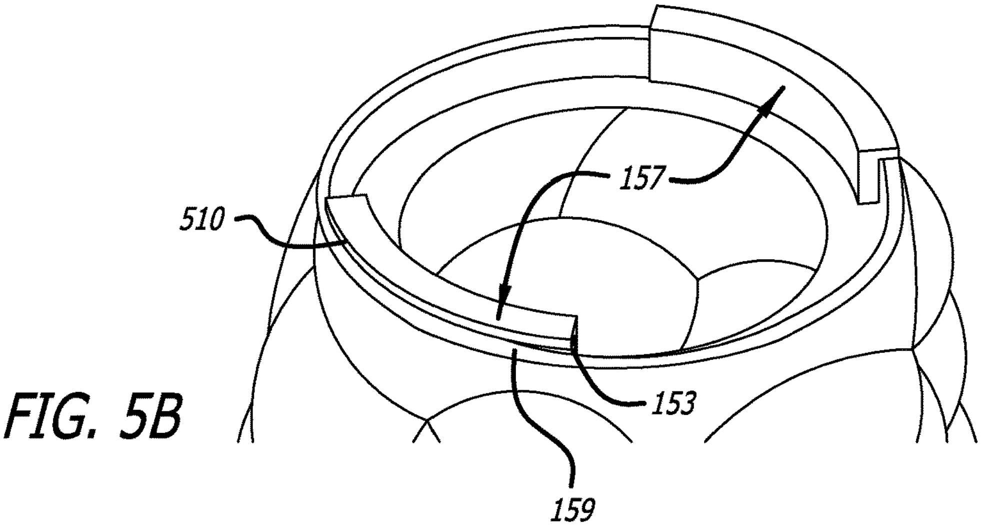
FIG. 5B is a perspective view of an exemplary embodiment of a channeled, connection segment extending from a circular boundary element of the soap dispenser of FIG. 5A.

Each of the segments 157, such as the first segment 510 for example, includes the channel 153. The channel 153 is sized to receive a corresponding flange 128, which extends substantially orthogonal from the inner surface 127 of the second circular segment 126 for the lid attachment member 120 and can be angularly rotated to reside within the channel 153. Upon the flange 128 engaging the channel 153, the soap dispenser 150 is physically attached to the character lid 110 adapted with the lid attachment member 120. A more detailed view of the first segment 510 and channel 153 for engagement with the flange 128 associated with the lid attachment member 120 is shown in FIG. 5B.

Figure 6B:
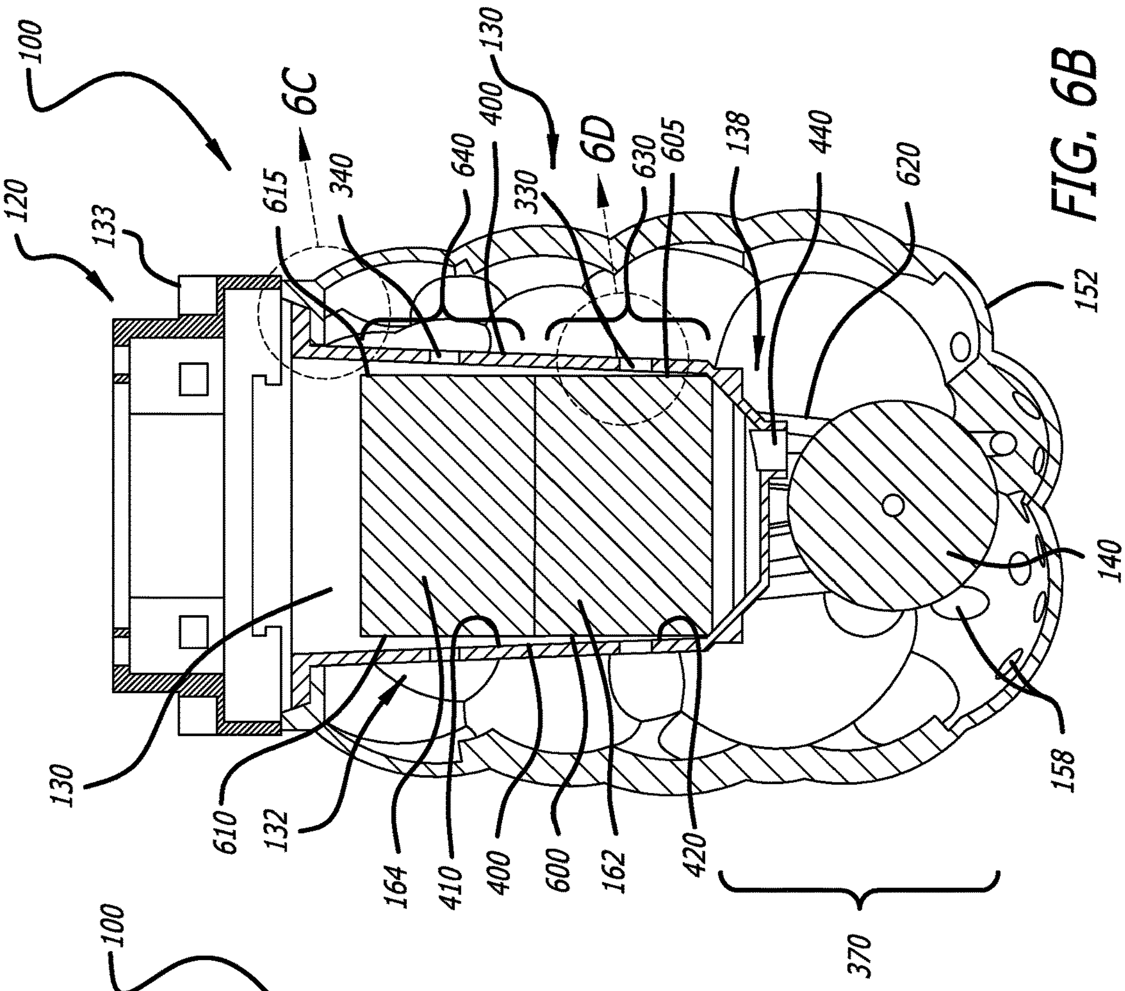
FIG. 6B is a cross-sectional side view of the soapsuds generation apparatus of FIG. 6A in accordance with cross-sectional lines A-A.
Figure 6A:
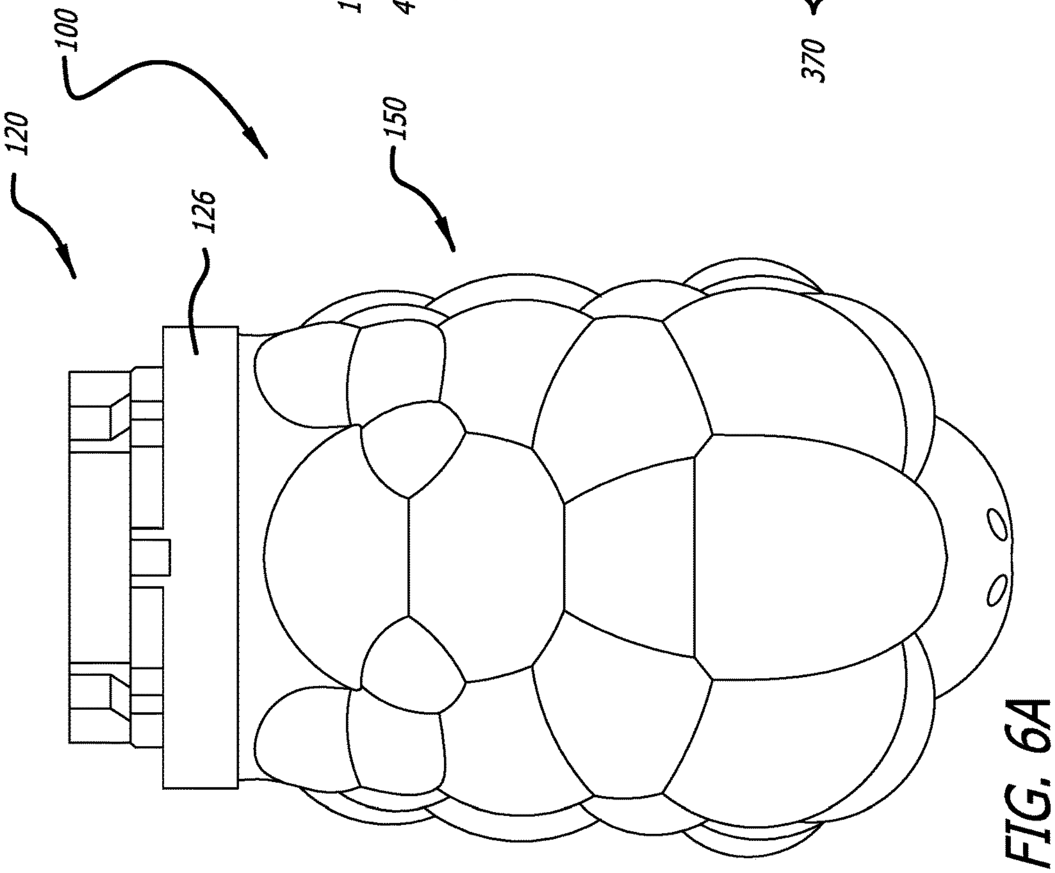
FIG. 6A is a side view of the soapsuds generation apparatus of FIGS. 3A-3B after assembly.

Referring now to FIG. 6A, a side view of the soapsuds generation apparatus 100 of FIGS. 3A-3B after assembly is shown. Herein, the soap tablet holding member 130 (not shown) is positioned with the soap dispenser 150, where the soap tablet holding member 130 is retained by pressure applied to the ledge portion 134 of the soap tablet holding member 130 by a surface of the second circular segment 126 of the lid attachment member 120 and ledge portion 155 of the soap dispenser 150.

Referring to FIG. 6B, a cross-sectional side view of the soapsuds generation apparatus of FIG. 6A in accordance with cross-sectional lines A-A is shown. Herein, lateral (cylindrical) surfaces 400 of the chamber portion 132 for the soap tablet holding member 130 are tapered to provide a greater distance between upper inner surface regions 410 of the chamber portion 132 than lower inner surface regions 420 of the chamber portion 132. This tapering allows soapy liquid (e.g., soapy water) to propagate along exterior side surfaces 600-605 of the first soap tablet 162 and/or exterior side surfaces 610-615 of the second soap tablet 164 to create a greater concentration of soapsuds flowing via the apertures 330 and 340 than would be experienced by a non-tapered chamber portion. The reason is that the tapering provides additional agitation of the soapy water during a flow through opening 133 of the soap tablet holding member 130. As shown, the distance between the exterior side surfaces 610-615 of the second soap tablet 164 and the upper inner surface regions 410 of the chamber portion 132 is greater than (and increases due to the tapered structure) the distance between the exterior side surfaces 600-605 of the first soap tablet 162 and the lower inner surface regions 420 of the chamber portion 132.

As further shown in FIG. 6B, the soap tablet holding member 130 includes a flow output port 440 placed within the bottom surface 138 of the chamber portion 132. As a fluid (e.g., an aqueous fluid such as water) flows from into the chamber portion 132 via the lid attachment member 120 and receives particles from the soap tablet(s) 162 and/or 164 to create a fluid with such particles (e.g., soapy water 620) that flows to the agitator 140 via the flow output port 440. The agitator 140 mixes the soapy water 620 during receipt via the flow output port 440 and temporary retention in the lower quadrant 370 of the housing 152 when an inflow rate of water into the opening 133 exceeds an outflow rate of soapsuds (bubbles and remnant water) via apertures 158.

Besides the flow output port 440, the soap tablet holding member 130 includes the lateral apertures 330 within a first region 630 of the lateral surface 400 of the chamber portion 132, which are proximate to a storage area in which the first soap tablet 162 resides. The same configuration is provided via lateral apertures 340 within a second region 640 of the lateral surface 400 of the chamber portion 132, which are proximate to a storage area of the chamber portion 132 within the second soap tablet 164 resides. The lateral side apertures 330 and/or 340 are placed within the lateral surfaces 400 of the chamber portion 132 for the soap tablet holding member 130 to prevent backflow of the soapy fluid from flowing up and out of the soap tablet holding member via its top opening 133.

Figure 6D:
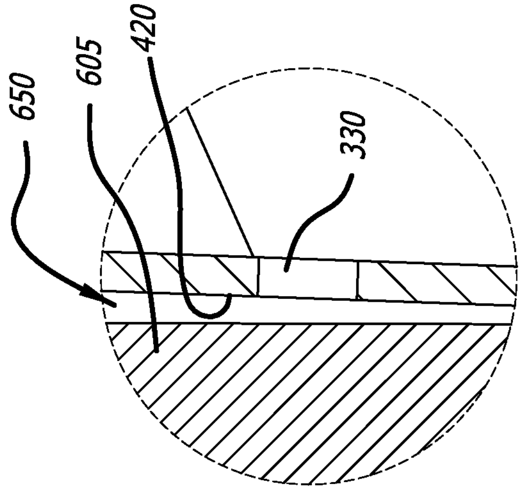
FIG. 6D is an exemplary embodiment of a lateral surface of the soap tablet holder member featuring a side aperture.
Figure 6C:
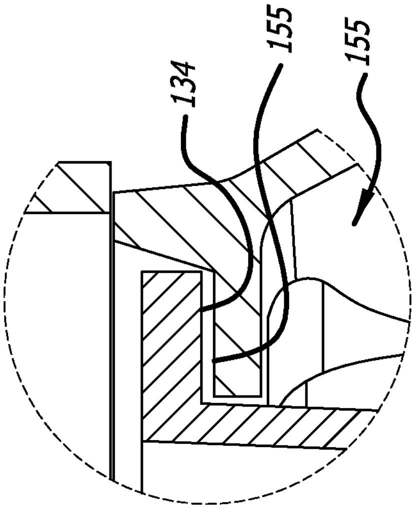
FIG. 6C is an exemplary embodiment of an area of connectivity between a lid attachment member, a soap tablet holding member, and a soapsuds dispenser of the soapsuds generation apparatus of FIG. 4B.

The soap tablet holding member 130 is held stationary based on pressures applied to the ledge portion 134 of the soap tablet holding member 130 by the ledge portion 155 of the soapsuds dispenser 150 as shown in FIG. 6C.

Referring to FIG. 6D, an exemplary embodiment of the first region 630 of the lateral surface 400 of the soap tablet holder member 130 featuring the side aperture 330 is shown. Herein, the aperture 330 is formed within the first region 630 of the lateral surface 400 and positioned laterally from the first soap tablet 162, which is illustrated as a solid soap pellet. A spacing 650 between the exterior side surface 605 of the first soap tablet 162 and the lower inner surface regions 420 of the chamber portion 132 decreases approaching the bottom surface 138 of the soap tablet holding member 130.

Figure 7B:
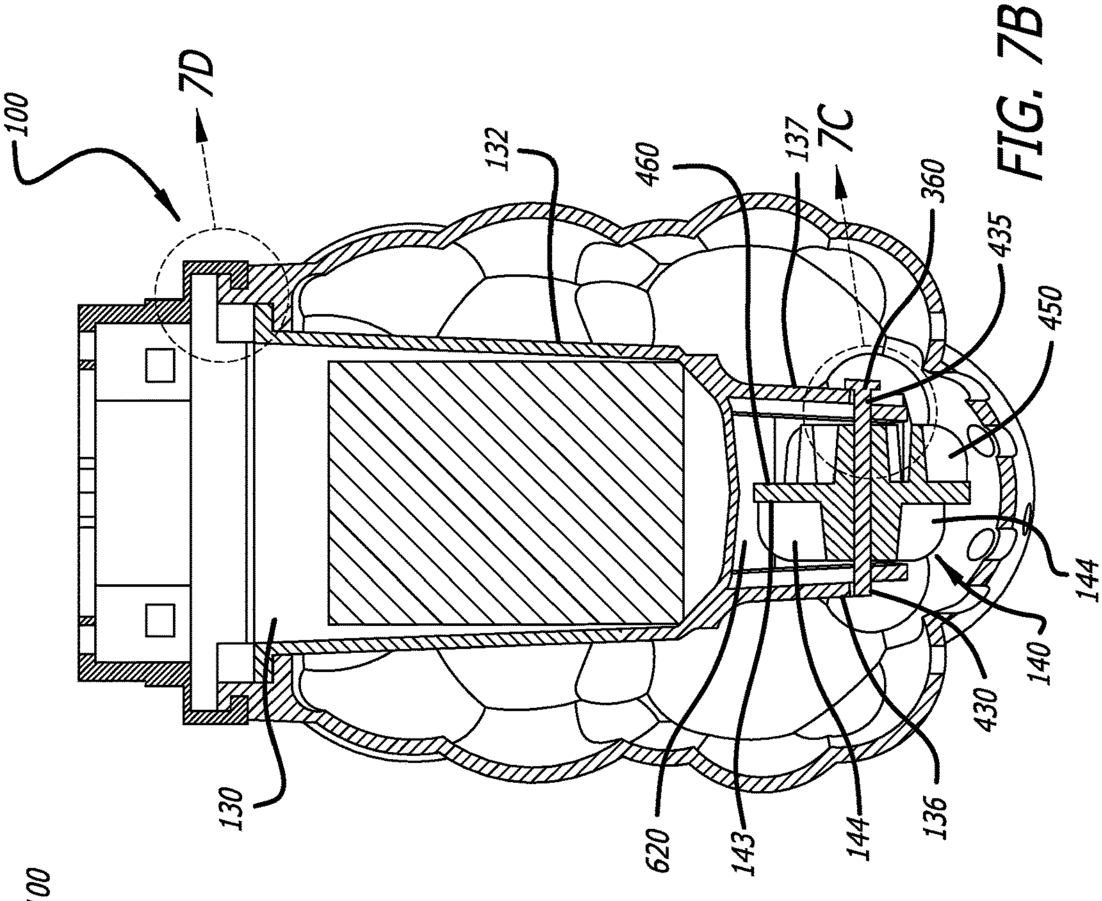
FIG. 7B is a cross-sectional front view of the soapsuds generation apparatus of FIG. 7A in accordance with cross-sectional lines B-B.
Figure 7A:
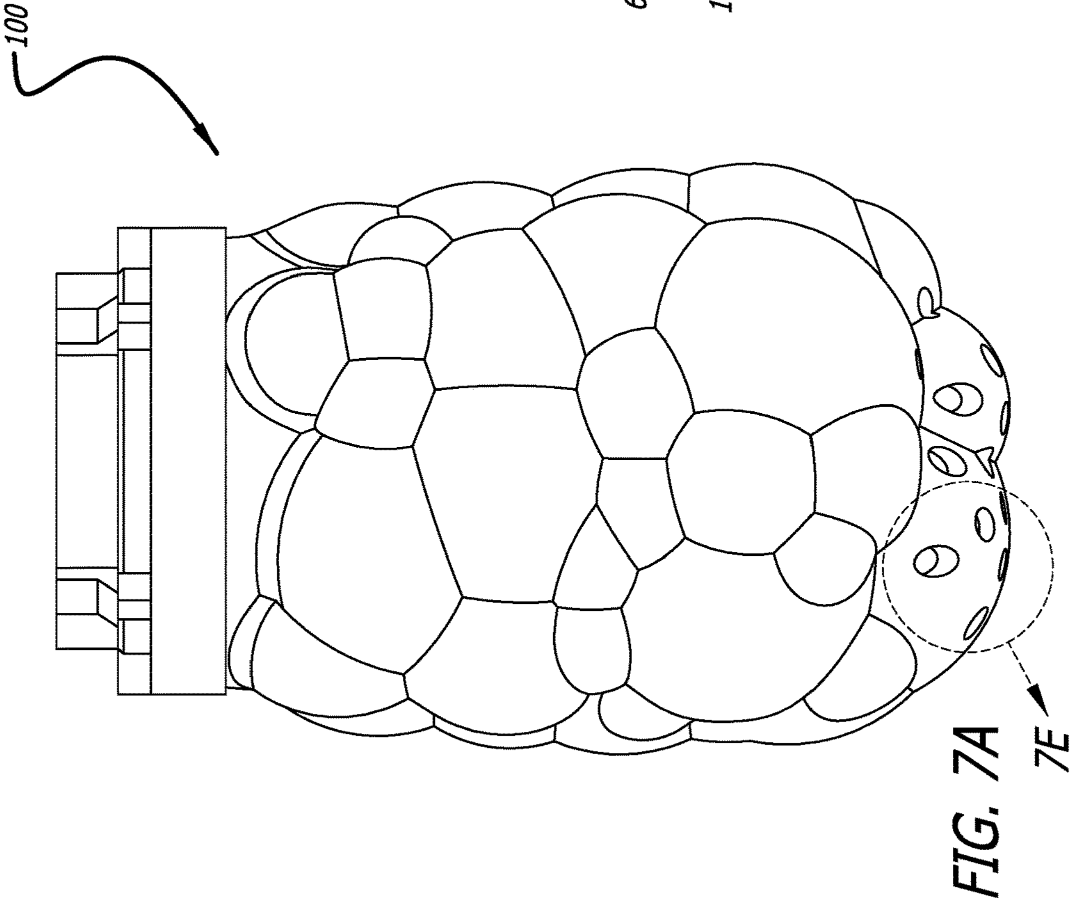
FIG. 7A is a front-facing view of the soapsuds generation apparatus of FIGS. 3A-3B after assembly.

Referring now to FIG. 7A, a front-facing view of the soapsuds generation apparatus 100 of FIGS. 3A-3B after assembly is shown. Herein, the soap tablet holding member 130 (not shown) is positioned with the soap dispenser 150, where the soap tablet holding member 130 is retained by pressure applied by components of the lid attachment member 120 and the soap dispenser 150.

As shown in FIG. 7B, a cross-sectional front view of the soapsuds generation apparatus 100 of FIG. 7A in accordance with cross-sectional lines B-B is shown. The agitator 140 is positioned between the pair of support members 136-137 extending from the chamber portion 132 of the soap tablet holding member 130. The agitator 140 includes the agitator wheel 142 rotatably coupled about its axis by the fastening member 360 inserted through apertures 430 and 435 formed in the support members 136 and 137 in order to secure the agitator wheel 142 to the soap tablet holding member 130. The wheel 142 includes the first lateral surface 143 and the second lateral surface 460.

Herein, as shown in FIG. 7B, the first set of slats 144 are positioned along the first lateral surface 143 and the second set of slats 450 are positioned along the second lateral surface 460. According to this embodiment of the disclosure, the slats 144 and 450 formed in the agitator wheel 142 may extend horizontally from the lateral surfaces 143 and 460 and are angled from its axis that features the fastening member 360 to provide depth and more surface area to increase rotation rate of the wheel caused by the flow of soapy water 620. Additionally, the slats 144 and 450 may be angularly offset (i.e., staggered) from each other, as shown.

Figure 7E:
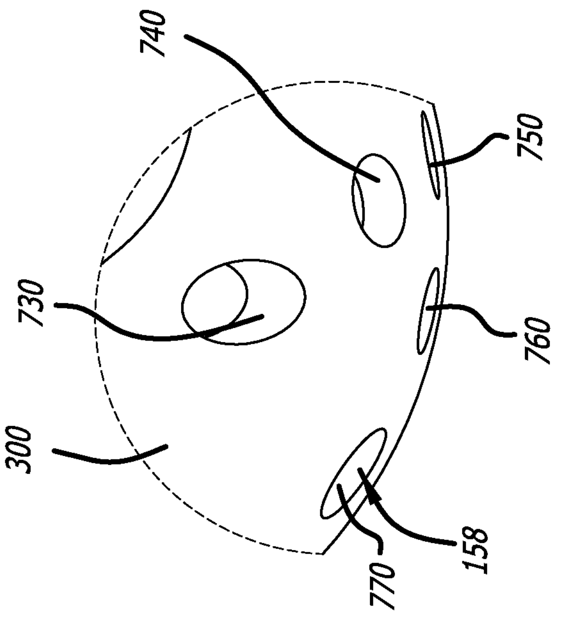
FIG. 7E is an exemplary embodiment of a bottom surface of a housing of the soapsuds dispenser of the soapsuds generation apparatus of FIGS. 3A-3B.
Figure 7D:
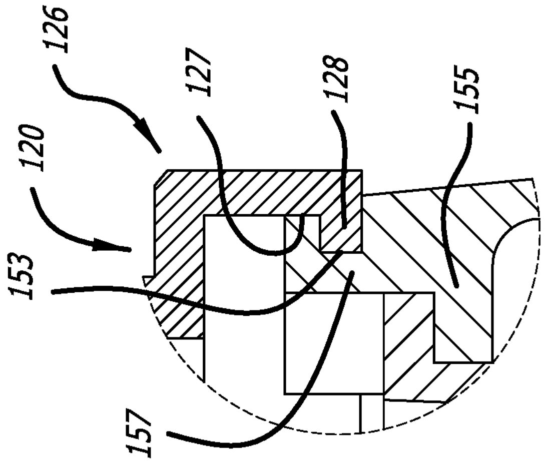
FIG. 7D is an exemplary embodiment of an area of connectivity between the lid attachment member, the soap tablet holding member and the soapsuds dispenser of the soapsuds generation apparatus of FIGS. 3A-3B.
Figure 7C:
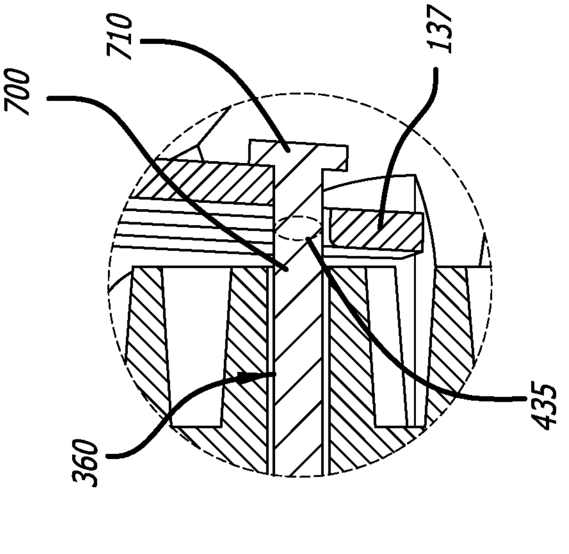
FIG. 7C is an exemplary embodiment of a fastening member to secure an agitator wheel to a pair of support members extending from the chamber portion of the soap tablet holding member that is deployed within the soapsuds generation apparatus of FIGS. 4A-4B.

Referring to FIG. 7C is an exemplary embodiment of the fastening member 360 to secure the agitator wheel 142 to the pair of support members 136-137 extending from the chamber portion 132 of the soap tablet holding member 130 deployed within the soapsuds generation apparatus 100 of FIG. 7A is shown. Herein, the fastening member 360 corresponds to an agitator pin 700 including a head portion 710 that engages with the support member 137 to preclude further lateral movement of the agitator pin 700 when inserted through apertures 430 and 435.

Referring to FIG. 7D is an exemplary embodiment of an area of connectivity between the lid attachment member 120, the soap tablet holding member 130 and the soapsuds dispenser 150 of the soapsuds generation apparatus 100 of FIG. 7A is shown. Herein, the flange 128 extending from the inner surface 127 of the second circular segment 126 for the lid attachment member 120. As shown, the flange 128 slides into the channel 153 created within the segment 157 orthogonal to the ledge portion 155.

Referring to FIG. 7E, an exemplary embodiment of the bottom surface 156 of the housing 152 for the soapsuds dispenser 150 of the soapsuds generation apparatus of FIG. 7A is shown. Herein, the apertures 158 are located at different locations with the bottom surface 156, and thus, feature different cross-sectional shapes 730, 740, 750, 760 and 770 depending on the location of the aperture on a particular concave segment 310 of the housing 152 for the soap dispenser 150.

Figure 8:
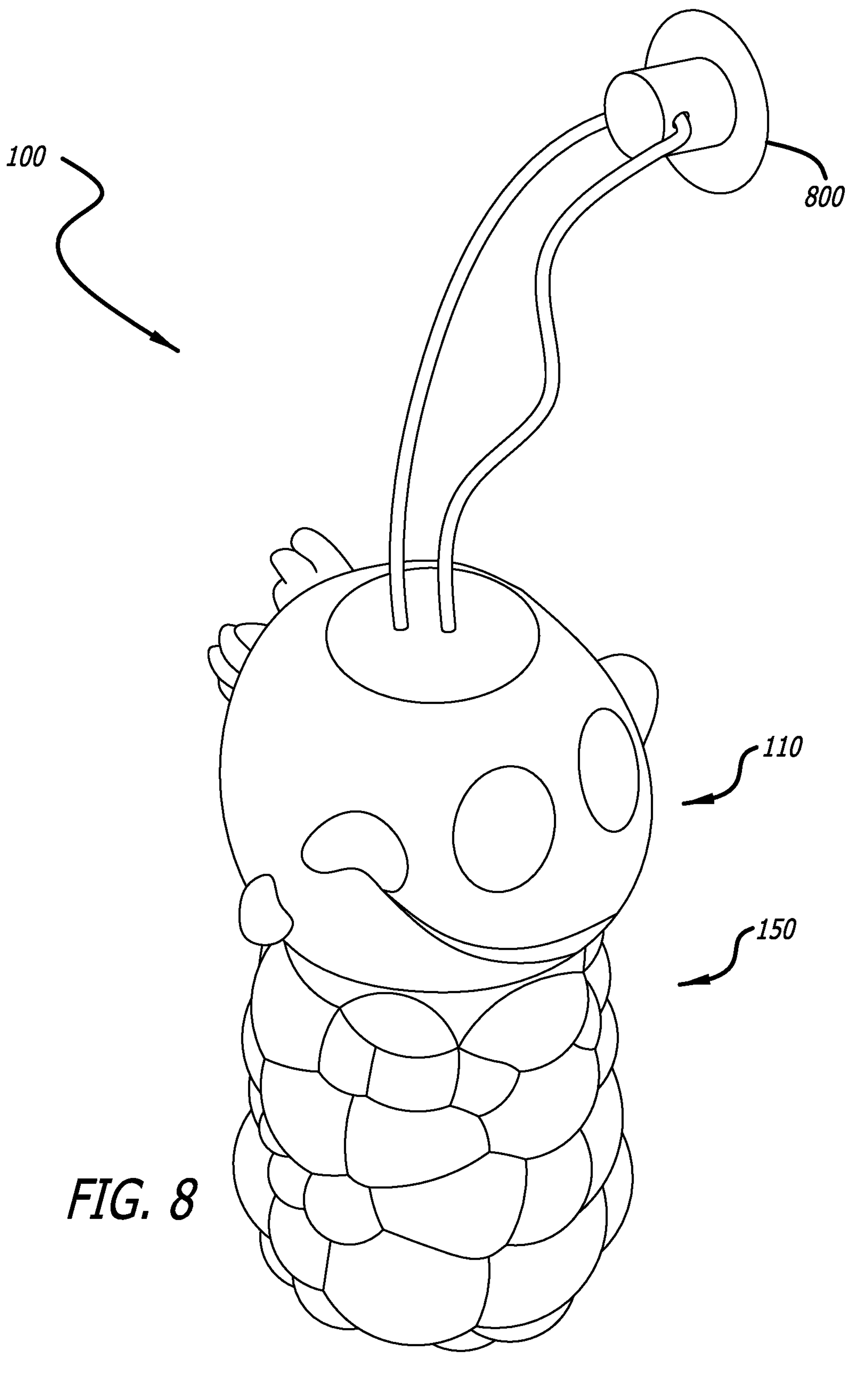
FIG. 8 is an exemplary embodiment of the assembled soapsuds generation apparatus of FIGS. 1-7E.

As shown, FIG. 8, an exemplary embodiment of the assembled soapsuds generation apparatus 100 of FIGS. 1-7E is shown. Both the character lid 110 and the soap dispenser are removable. This allows different character lids to be utilized with the same soap dispenser 150 to make bath time more fun. The lid attachment member 120 (not shown) is also removable from the character lid 110 upon disengaging the locking elements described above. Also, the suction cup 800 is shown to be positioned on the cord 240 to allow the soapsuds generation apparatus 100 to be secured to a wall or other surface positioned above the tub spout or another type of faucet.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. An apparatus, comprising:

a holding member including a chamber portion sized to retain one or more soap tablets and structured in a conical shape, the chamber portion being formed by (i) an opening, (ii) a bottom surface including an outlet, and (iii) tapered lateral surfaces extending between a perimeter of the opening and a perimeter of the bottom surface;

an agitator coupled to the holding member and positioned under the outlet of the holding member; and a soap dispenser including a housing with an open first end, a closed second end, and an interior area to encapsulate the agitator and the holding member, the housing includes a first ledge portion that extends radially along the open first end and supports segments of a second ledge portion extending radially from the opening of the holding member.

2. The apparatus of claim 1, wherein the tapered lateral surfaces of the holding member include apertures to prevent backflow of soapsuds or soapy water passing between the one or more soap tablets and an inner surface of the tapered lateral surfaces through the opening of the holding member.

3. The apparatus of claim 1, wherein the segments of the second ledge portion of the holding member having a greater width than a remainder of the second ledge portion of the holding member.

4. The apparatus of claim 1, wherein the chamber portion of the holding member is sized so that a distance between (1) a side surface of a first soap tablet of the one or more soap tablets resting on the bottom surface of the holding member and (2) an inner surface of the tapered lateral surfaces adjacent to the side surface of the first soap tablet is less than a distance between (3) a side surface of a second soap tablet of the one or more soap tablets resting on the first soap tablet and (4) the inner surface of the tapered lateral surfaces adjacent to the side surface of the second soap tablet.

5. The apparatus of claim 1, wherein the agitator comprises an agitator wheel coupled to support members extending from the chamber portion of the holding member, the agitator wheel being vertically aligned with the outlet so that a fluid flowing through the opening of the holding member is adapted to flow through the outlet and contact slats formed as part of the agitator wheel.

6. The apparatus of claim 5, wherein an axis pin is coupled to both of the support members and the agitation wheel is rotationally coupled to the axis pin.

7. The apparatus of claim 5, wherein the agitator wheel is positioned in a lower quadrant of the interior area of the housing of the soap dispenser to generate soapsuds by rotation of the agitator wheel to mix soapy water being the fluid passing through the outlet, the soapsuds passing though apertures within the closed second end of the housing.

8. The apparatus of claim 7, wherein the housing of the soap dispenser is formed by a plurality concave segments that create a coarse inner surface of the interior area of the housing.

9. The apparatus of claim 1 further comprising:

a character lid; and a lid attachment member configured for coupling to the character lid and to the open first end of the housing of the soap dispenser.

10. An apparatus, comprising:

a holding member including a chamber portion sized to retain one or more soap tablets, the chamber portion being formed with (i) a first end including an opening, (ii) a second end including an outlet, and (iii) lateral surfaces extending between the first end and the second end;

an agitator rotationally coupled to the holding member and positioned under the outlet of the holding member; and a soap dispenser including a housing with an open first end, a closed second end, and an interior area to encapsulate the agitator residing within a lower quadrant of the interior area of the housing, the housing includes a plurality of apertures formed within the closed second end to allow for passage of soapsuds and soapy water flowing through the opening and the outlet of the holding member and causing the agitator to mix the soapy water residing within the interior area of the housing of the soap dispenser.

11. The apparatus of claim 10, wherein the lateral surfaces of the holding member includes apertures and are tapered so that the holding member is formed with a conical shape.

12. The apparatus of claim 11, wherein the apertures formed in the lateral surfaces of the holding member prevent backflow of soapsuds or soapy water passing between one or more soap tablets inserted into the chamber portion and an inner surface of the tapered lateral surfaces and passing through the opening of the holding member.

13. The apparatus of claim 10, wherein the chamber portion of the holding member is sized so that a distance between (1) a side surface of a first soap tablet residing within the chamber portion and (2) an inner surface of the lateral surfaces adjacent to the side surface of the first soap tablet is less than a distance between (3) a side surface of a second soap tablet residing on the first soap tablet and (4) the inner surface of the lateral surfaces adjacent to the side surface of the second soap tablet.

14. The apparatus of claim 10, wherein the agitator comprises an agitator wheel coupled to support members extending from the chamber portion of the holding member, the agitator wheel being vertically aligned with the outlet so that a fluid flowing through the opening of the holding member is adapted to flow through the outlet and contact slats formed as part of the agitator wheel to rotate the agitator wheel and mix the fluid temporarily residing within the lower quadrant of the interior area of the housing to generate soapsuds to propagate through the plurality of apertures formed within the closed second end.

15. The apparatus of claim 14, wherein an axis pin is coupled to both of the support members and the agitator wheel is rotationally coupled to the axis pin.

16. The apparatus of claim 10, wherein the housing of the soap dispenser is formed by a plurality concave segments that create a coarse inner surface of the interior area of the housing.

17. An apparatus comprising:

a character lid including a conduit sized to receive one or more soap tablets;

a lid attachment member includes a first circular segment inserted into a bottom opening of the conduit of the character lid and attached to the character lid;

a holding member including a chamber portion sized to retain the one or more soap tablets inserted through the conduit, the chamber portion being formed with (i) a first end including an opening, (ii) a second end including an outlet, and (iii) lateral surfaces extending between the first end and the second end;

an agitator rotationally coupled to the holding member and positioned under the outlet of the holding member; and a soap dispenser including a housing with an open first end, a closed second end, and an interior area to encapsulate the agitator residing within a lower quadrant of the interior area of the housing, the housing is coupled to a second circular segment of the lid attachment member and includes a plurality of apertures formed within the closed second end to allow for passage of soapsuds and water flowing through the opening, contacting the one or more soap tablets to produce soapy water, flowing through the outlet of the holding member, and causing the agitator to mix the soapy water residing within the interior area of the housing of the soap dispenser to generate the soapsuds.

18. The apparatus of claim 17, wherein the agitator comprises an agitator wheel coupled to support members extending from the chamber portion of the holding member, the agitator wheel being vertically aligned with the outlet so that a fluid flowing through the opening of the holding member is adapted to flow through the outlet and contact slats formed as part of the agitator wheel to rotate the agitator wheel and mix the soapy water temporarily residing within the lower quadrant of the interior area of the housing to generate the soapsuds to propagate through the plurality of apertures formed within the closed second end.

19. The apparatus of claim 18, wherein an axis pin is coupled to both of the support members and the agitator wheel is rotationally coupled to the axis pin.

* * * * *